United States Patent [19]

Liebert et al.

[11] Patent Number: 4,466,243
[45] Date of Patent: Aug. 21, 1984

[54] HYDROSTATIC POWER STEERING SYSTEM WITH CURVED VALVE RETURN SPRINGS

[75] Inventors: Karl-Heinz Liebert, Schwabisch; Rolf Fassbender, Mutlangen; Werner Tischer, Bobingen, all of Fed. Rep. of Germany

[73] Assignee: Zahnradfabrik Friedrichshafen, A.G., Friedrichshafen, Fed. Rep. of Germany

[21] Appl. No.: 299,326

[22] Filed: Sep. 4, 1981

[30] Foreign Application Priority Data

Oct. 4, 1980 [DE] Fed. Rep. of Germany ....... 3037660

[51] Int. Cl.³ .................... B62D 5/08; F15B 13/04; F16F 1/18
[52] U.S. Cl. .................... 60/384; 418/61 B; 267/164; 137/625.69
[58] Field of Search ............ 60/384; 418/61 B; 137/625.21, 625.24, 625.68, 625.69; 180/132; 267/158, 160, 164

[56] References Cited

U.S. PATENT DOCUMENTS

| | | | |
|---|---|---|---|
| 2,044,451 | 6/1936 | Teetor | 267/164 |
| 2,632,398 | 3/1953 | Ferris | 267/160 |
| 2,984,215 | 5/1961 | Charlson | 91/467 |
| 4,016,949 | 4/1977 | Plate et al. | 60/384 |
| 4,251,194 | 2/1981 | Petersen | 418/61 B |
| 4,344,283 | 8/1982 | Liebert et al. | 418/61 B |
| 4,354,350 | 10/1982 | Tischer et al. | 418/61 B |

FOREIGN PATENT DOCUMENTS 1751979 10/1971 Fed. Rep. of Germany.
2814230 10/1979 Fed. Rep. of Germany.

OTHER PUBLICATIONS

ZF-Servostat 2, G8470 P-SL 9/80e, Sep. 1980, Zahnradfabrik Friedrichshafen A.G., Schwabisch Gmund Div., D-7070 Schwabisch Gmund, Postfach 1340, Germany.

Der Neve ZF-Servostat, G8470P-SL 3/80d, Mar. 1980, Zahnradfabrik Friedrichshafen A.G., Postfach 1340, D-7070 Schwabisch Gmund, Germany.

Primary Examiner—John J. Vrablik
Attorney, Agent, or Firm—Zalkind & Shuster

[57] ABSTRACT

A flow control valve for a power steering system of the kind having a metering pump is provided with a leaf spring device stressed upon rotation of a hand steering wheel to operate a valve sleeve and the metering pump. The spring device provides a force for returning the valve sleeve to neutral position after a steering operation and comprises curved or arched springs between pressure plates. The convex sides are back-to-back between pressure plates and have curved ends supported on and shaped to slide on the pressure plates with minimum friction as the springs are compressed. The pressure plates are uniquely shaped in the central areas for providing flexibility to compensate for manufacturing inaccuracies. The spring device is assembled in a carrier with the pressure plates under initial compression and an actuating sleeve within the valve sleeve is rotated by a manual force on a steering wheel to stress the springs and to rotate the metering pump and, via a coarse threaded connection, shift the valve sleeve axially for flow control to a servomotor. The springs are elongated in the axial direction of the valve sleeve and operated by stressing their margins between the actuating sleeve and a spring assembly carrier, the arrangement being such that no direct contact between the springs or pressure plates acts against the valve sleeve. However, the initial compression of the springs ensures a force for maintaining the valve sleeve in neutral position.

9 Claims, 5 Drawing Figures

HYDROSTATIC POWER STEERING SYSTEM WITH CURVED VALVE RETURN SPRINGS

BACKGROUND

Hydrostatic power steering systems of the kind shown herein are basically shown in a German publication DE-OS No. 17 51 979 wherein the valve sleeve is axially movable for flow control and distribution of pressure oil to the pressure chambers of a servomotor. Axial movement is effected by means of a coarse pitch thread upon rotation of a steering spindle which rotation also rotates a metering pump through a universal shaft linkage. A torque rod return means is utilized to return the valve sleeve to neutral center position which torque rod is fastened at one end to the steering spindle and valve sleeve and at the other end to the universal shaft linkage. The torque rod is twistedly stressed initially when the steering spindle is rotated by manual force at its steering wheel. Since the first end of the torque rod is rotated while the second end cannot initially rotate due to road resistance against the vehicle wheels, a well known effect, accordingly, the valve sleeve is initially rotated to provide communication between grooves and passages of the valve sleeve and steering housing for pressurizing the servomotor. The return restoring force of the torque rod acts only between the steering spindle and the universal linkage connected to the metering pump. This leaves the valve sleeve uncontrolled by any forces acting to ensure a hydraulically centered neutral position, because once the torque rod has untwisted it is completely without stress which might act to enforce an exact centered position of the valve sleeve. Accordingly, inaccuracy of neutral centering of the valve sleeve can occur due to inherent friction and also as the result of acceleration forces caused by road shock in the course of driving.

The preceding disadvantage is avoided in German Pat. No. 28 14 230 which employs a pair of leaf springs which are bowed and assembled between pressure plates with the convex sides of the springs in contiguity and the ends of the springs engaging the surfaces of the pressure plates. Such assembly is inserted in radial slots which pass through a pair of valve sleeves and upon rotation of one such sleeve compression of the bowed springs takes place whereby stress is stored for return of the valve sleeves relative to each other to a neutral position. Inasmuch as the springs can be inserted in the assembly under some stress, such stress is present for effecting an exact neutral position. The springs are prevented from being overstressed by being sandwiched between the pressure plates against which the compressive forces of valve sleeve rotation are exerted.

In the above described arrangement, the ends of the springs make a sharp edge contact against the pressure plates, and when the springs are compressed or permitted to expand, the change in length causes abrasion and frictional forces to occur. This results in considerable hysteresis in spring characteristic during compression and expansion in the springs during operation of the valve sleeve.

Since the leaf springs of the prior art are disposed radially across the diameter of the valve sleeve, and are narrow in the longitudinal direction of the valve sleeves, their extent of overall flexing is limited by the limited diameter of the valve sleeves. Accordingly, considering that the springs and pressure plates are normally in initial force exerting condition within narrow slots of the valve sleeve, with small surfaces exposed to full restoring force of the leaf springs at all times and more particularly during actuation of the valve, strong forces are brought into being. This could lead to deformation of the valve sleeves and, in any event, increased wear results.

Additionally, background art is seen in U.S. Pat. No. 4,174,612 and in publications of the assignee of this application, entitled:

Der Neue ZF-Servostat, identified as G8470P-SL 3/80d, and

ZF Servostat 2, identified as G8470P-SL 9/80d.

THE PRESENT INVENTION

The invention herein overcomes the disadvantages described above by providing a construction wherein a valve sleeve is not acted upon by the return restoring force of the spring device for neutral position, but is centered in neutral position by a residual accurately determinable spring device force having an initial compression which effects forces isolated from the valve sleeve, but nevertheless operative thereon.

By way of comparison with the bowed spring device of the prior art as described above, the present invention utilizes an axially elongated pair of bowed springs extending longitudinally in the direction of the valve sleeve and operative to effect forces through an actuating sleeve at longitudinally spaced points whereby a distribution of forces occurs instead of a concentration of forces as occurs in a relatively narrow spring assembly extending across one end of the valve sleeve. Accordingly, by the use of such elongated leaf springs, a relatively large flexible area is afforded, even for a small diameter of valve assembly. The pressure plates extend fully of the leaf springs, and the edges of the spring are rounded so as to slide easily on the pressure plates with compression and expansion of the springs during use. Such spring device in an assembly is disposed within a spring carrier of suitable elongation accommodated within the actuating sleeve. Inasmuch as the spring carrier is a force transmitting component in the course of valve actuation, it provides a large axial length of line contact with the spring assembly through the pressure plates.

A feature of the invention provides specially shaped pressure plates which are narrowed at their central areas to provide low torsional stiffness, whereby a certain amount of flexibility is possible to compensate manufacturing inaccuracies. Accordingly, the pressure plates can flex when necessary so as to provide full surface support to the leaf springs at the ends thereof. Further, the actuating sleeve has grooves which are diametrically opposed and in which the longitudinal margins of the pressure plates extend to be engaged by edges of the grooves for stressing the leaf springs when the actuating sleeve is rotated. The groove sides are made at least radial, that is conically widened to permit space for maximum spring travel of the leaf spring assembly. The spring device carrier is concentrically disposed within the actuating sleeve and has a slot in which the spring device is carried. The edges of such slot are rounded to reduce friction and wear against the pressure plates.

A detailed description of the invention now follows in conjunction with the appended drawing in which.

Figure 1:
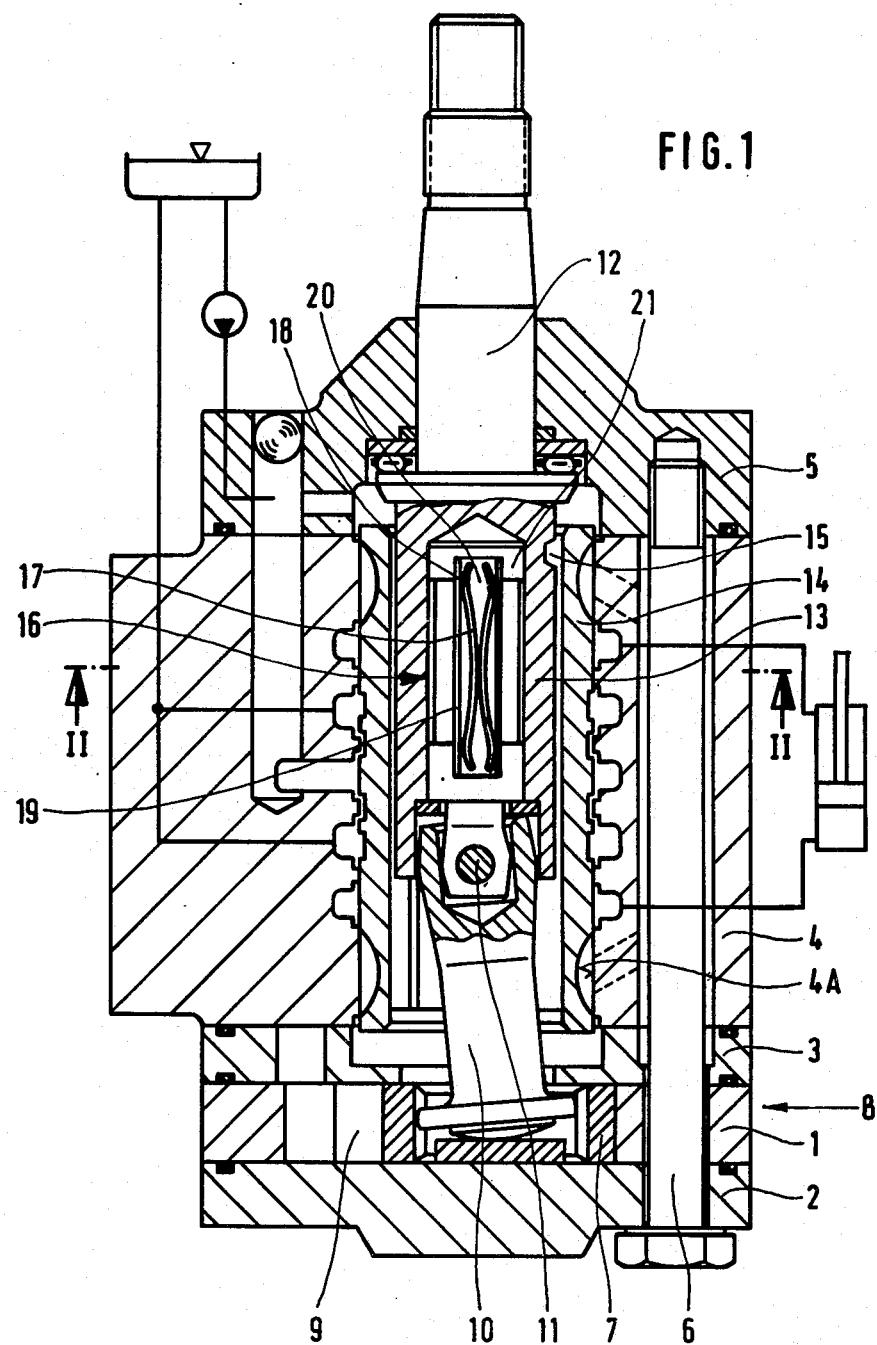
FIG. 1 is a longitudinal section through a hydraulic power steering device showing certain components of the invention, but being otherwise conventional and illustrating springs with reversely curved ends.

Referring to FIG. 1, a metering pump comprising an annular gear 1 is disposed between a pump end plate 2 and a cheek plate 3 fastened to a housing 4 having an opposite end cover 5, all assembled by means of screws 6. A pump gear 7 within gear 1 has one tooth less than gear 1. The gears effect a manually operable metering pump 8 wherein pumping cells 9 are formed between the teeth of gear 1 and gear 7 and the faces of cover 2 and cheek plate 3.

Gear 7 is connected in the usual manner to a steering spindle 12 via the universal shaft 10 and drive pin 11 wherein it will be understood that steering spindle 12 is operable by a hand wheel (not shown). Housing 4 has a bore 4A containing a valve sleeve 14 encompassing an actuating sleeve 13. Rotation of steering spindle 12 rotates valve sleeve 14 which is axially movable in either direction by means of coarse pitch threading 15 disposed between the two sleeves.

Figure 5:
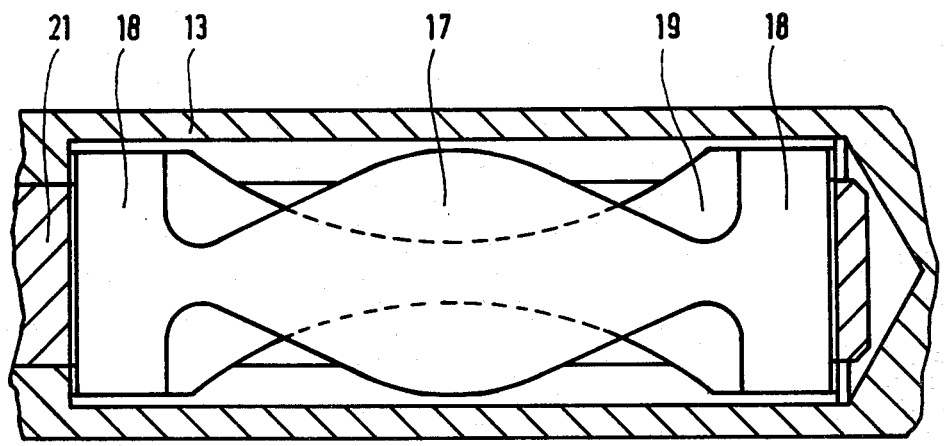
FIG. 5 is an enlarged longitudinal section of the spring assembly of FIG. 1 taken at right angles thereto.

A spring device 16 is disposed between shaft 10 and steering spindle 12, FIG. 1. The spring device 16 comprises two bowed leaf springs 17 extending elongated axially of the valve sleeve 14 and having ends 18 reversely rounded to present convex surfaces for support against pressure plates 19. The entire spring assembly is carried in a longitudinal slot 20 of a spring carrier 21 concentric within actuating sleeve 13 and connected at one end via shaft 10 to the metering pump. As seen in FIG. 5 elongation is maximized in slot 20.

Figure 2:
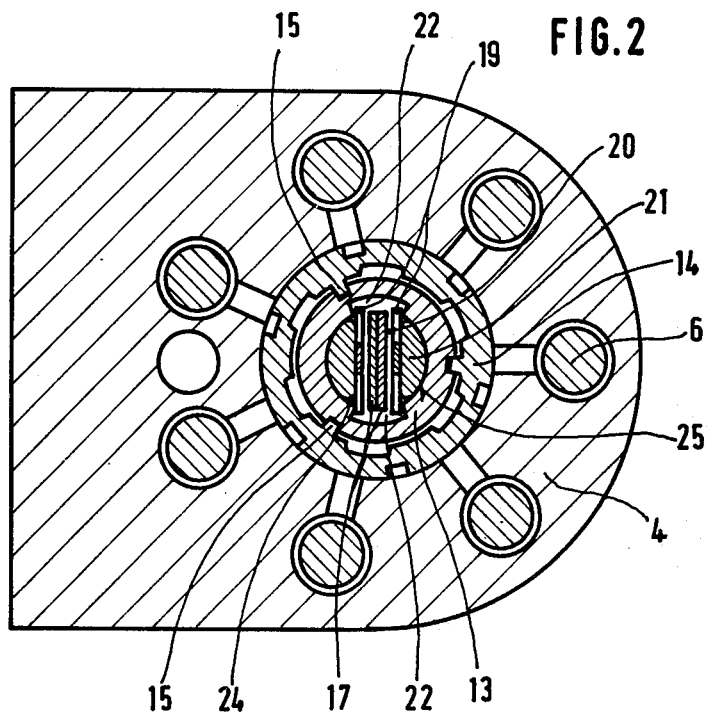
FIG. 2 is a radial section through II—II of FIG. 1 showing a neutral position of the valve.
Figure 3:
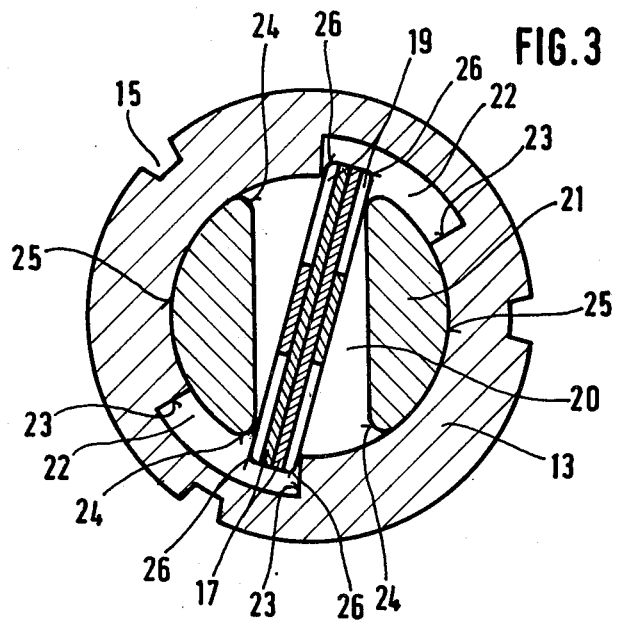
FIG. 3 is an enlargement in radial section of certain components of FIG. 2 showing a rotative position of the actuating sleeve with stress being applied to the spring assembly.

Referring to FIG. 3, the actuating sleeve 13 is provided with diametrically opposed grooves 22 which accommodate the longitudinal respective margins of the spring assembly. These grooves have edges or shoulders 23 which upon rotation of the actuating sleeve can exert a compressive force on the assembly. Thus by comparing the spring assembly of FIG. 3 with FIG. 2, it will be noted that the springs have been essentially flattened by clockwise rotation of actuating sleeve 13. In the course of assembling the spring device within the carrier, a certain degree of compression is provided in the leaf springs 17 between the corners of shoulders 23 as will be understood from FIG. 2, which compression is also exerted against the flat sides of slot 20 of the spring carrier 21. Thus initially the original compression provided in assembly of the convexity of the springs will, as can be understood from FIG. 2, effect an exact neutral hydraulically centered position of the valve sleeve 14 without, however, having any direct physical bearing thereon which would cause wear.

As described hereinabove and as particularly shown in FIG. 2, the pressure plates 19 are inserted between the leaf springs 17 and the edges of shoulders 23 of longitudinal grooves 22 of the operating sleeve 13 and carried in the longitudinal slot 20 of the spring carrier 21. Without such pressure plates the leaf springs would make point contact at their ends with the edges of the shoulders resulting in increased wear. However, by the use of novel pressure plates, line contact is achieved between the leaf springs and the pressure plate and between the pressure plates and the actuating sleeve 13 for distribution of the area of stress.

Figure 4:
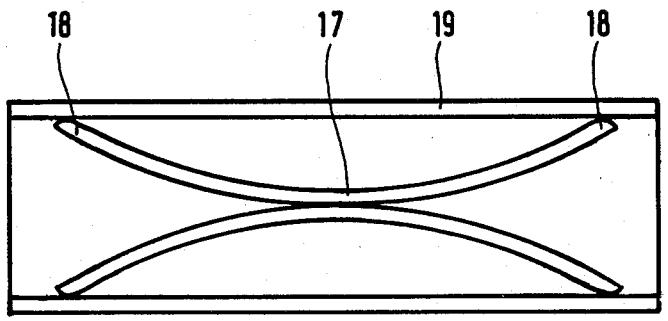
FIG. 4 is a magnified view of a pair of bowed springs between pressure plates showing rounded corners.

As illustrated in FIG. 1, the ends of the leaf springs are curved with a particular radius opposite to the curvature of the bowed portions of the spring. However, in FIG. 4 such ends 18 are rounded so that the compressing of the leaf springs will reduce wear on the pressure plates. This also produces a well defined spring characteristic.

Referring to FIG. 5, it will be noted that the pressure plates 19 are symmetrically shaped so as to be narrow in the center area and full width at the end areas. The purpose of such construction ensures that the pressure plates rest accurately against their supporting surfaces in flat smooth contact at their ends. Hence, the narrowing affords some flexibility in the event of manufacturing inaccuracies wherein full size plates may not be perfectly flat. The construction thus ensures that contact of the pressure plates is made only at the ends and against which ends the ends of the leaf springs rest.

For maximum spring travel, the shoulders 23 of grooves 22 are spaced conically, i.e., arcuately widened and, in fact, in FIG. 3 shoulder surfaces are shown as virtually radial. The purpose of such widening is to provide an accurately defined line contact between the pressure plates 19 and the operating sleeve 13. This occurs at the edges of the shoulders 23. As seen in FIG. 3, the corners 24 of the slot 20 of carrier 21 are well rounded in order to give a smooth transition of support to reduce friction and wear during spring compression.

Inasmuch as it is possible for the spring assembly to shift radially with respect to the axis, the longitudinal edges of pressure plates 19 can frictionally engage the inner surfaces of groove 22, FIG. 3. To reduce this friction and avoid the consequent hysteresis, the longitudinal edges 26 of the pressure plates 19 are rounded where there is possibility of engagement.

As heretofore stated, the flow control passages and functions of the valving are not part of the present invention, although various conduits, grooves and channels are shown in FIG. 1. However, this is all part of the prior art and no claim made thereto nor to any other features except as set forth in the combinations set forth in the claims.

We claim:

1. In a flow control valve having a valve sleeve rotative and axially movable in a housing with coacting grooves and passages therebetween for control of hydraulic servomotor flow, including a metering pump and an actuating sleeve (13) for operating said valve sleeve and said metering pump responsive to rotation of a steering shaft, and having a valve return spring device wherein said spring device (16) comprises arched springs (17) having curvatures arranged with their convex sides in contiguity and further comprising a respective pressure plate (19) disposed against the ends (18) of each spring on the outer sides thereof, including a carrier (21) having a slot (20) and said spring device being in the slot thereof under initial compression; and further including an acutating sleeve (13) concentric with said carrier and having diametrically opposed grooves (22) with the respective edges of said springs and pressure plates extending thereinto;

wherein the springs and pressure plates are elongated longitudinally of said valve sleeve so that rotation of said actuating sleeve (13) compresses said pressure plates against said springs between edges of said slot (20) and said grooves (22);

the improvement comprising:

the ends (18) of said springs being curved reversely to the curvature of the respective spring and having sliding bearing on the respective plate.

2. In a flow control valve as set forth in claim 1, said pressure plates (19) being narrowed in their central areas for flexibility to ensure flat end contact only on their supporting surfaces.

3. In a flow control valve as set forth in claim 1, the grooves (22) of the actuating sleeve having edges (23) angled to effect line contact with said pressure plate.

4. In a flow control valve as set forth in claim 1, the slot (20) of said carrier having rounded edges (24) for compressive contiguity with said pressure plates.

5. In a flow control valve as set forth in claim 1, the edges (26) of said pressure plates extending into said grooves (22) being longitudinally rounded.

6. In a flow control valve as set forth in claim 2, the grooves (22) of the actuating sleeve having edges (23) angled to effect line contact with said pressure plate.

7. In a flow control valve as set forth in claim 6, the slot (20) of said carrier having rounded edges (24) for compressive contiguity with said pressure plates.

8. In a flow control valve as set forth in claim 7, the edges (26) of said pressure plates extending into said grooves (22) being longitudinally rounded.

9. In a flow control valve as set forth in claim 8, the grooves (22) of the actuating sleeve having edges (23) angled to effect line contact with said pressure plate.

* * * * *